Patented Oct. 25, 1938

2,134,556

UNITED STATES PATENT OFFICE 2,134,556

INSECTICIDE

William F. Hester, Drexel Hill, Pa., assignor to Röhm & Haas Company, Philadelphia, Pa.

No Drawing. Application July 23, 1937,
Serial No. 155,222

4 Claims. (Cl. 167—30)

This invention relates to insecticidal compositions and particularly to the use of nitro derivatives of diaryl oxides, more especially of diphenyl oxide, as the active principle thereof.

The object of the invention is to provide insecticidal compositions of general application which can be used in low concentrations to control insect pests without injury to plant foliage. A further object is to provide an organic insecticide of the so-called stomach type to be used in place of lead arsenate, etc. against chewing insects such as bean beetles.

Diphenyl oxide has heretofore been suggested as an insecticidal composition but has never been widely used for the purpose because its low toxicity requires the use of such large dosages that injury to the plant foliage results. When used in concentrations sufficiently low to avoid foliage injury the insect control is poor.

It has been found, however, according to the present invention, that the introduction of one or more nitro groups into the diaryl oxide nucleus has the effect of greatly increasing the toxicity of the base material while at the same time reducing its corrosiveness to plant foliage. The nitro group or groups can be introduced into the ortho-, meta, or para position of either phenyl nucleus or both nuclei can be substituted with nitro groups. Other substituents may also be present. Among the additional substituents that have been found effective are alkyl groups either normal or branched, cycloalkyl groups, aralkyl groups, alkoxy groups, alkylene groups, aromatic groups, the halogens and similar neutral groups. These groups may also be in the ortho, meta or para position and may be on the same phenyl nucleus as a nitro group or one phenyl nucleus may be nitro substituted and the other one substituted by the additional substituent.

Compounds of this type can be prepared by the standard method of preparing nitro diphenyl oxides which in general consists in reacting a phenol with a nitro-chlorobenzene in the presence of alkali. To illustrate this method the following examples are given—

Example 1.—A mixture of 1044 g. of technical p-ter. butyl phenol, 316 g. of technical p-nitrochlorobenzene and 1 g. of copper dust was placed in a flask fitted with a reflux condenser, thermometer and stirrer and heated on an oil bath to 145° C. To this mixture there was then added slowly while stirring a mixture of 95 g. of powdered potassium hydroxide and 57 g. of powdered sodium hydroxide. The temperature was maintained at about 145° C. for two hours after the addition of the mixture of hydroxides was completed. The final temperature of the mixture in the flask was 129° C. and that of the oil in the bath 170° C. The resulting product was poured into three liters of ice water, shaken with ethylene dichloride and separated from the aqueous layer. The ethylene dichloride was then evaporated and the residue distilled under reduced pressure. The unreacted butyl phenol distilled over at about 124°–138° C/22 mm. and the main product at 193°–200° C/3 mm. This second fraction amounted to 460 g. which is a yield of 85% of the theoretical. On recrystallizing from 95% alcohol the product melted at 60°–61° C.

Example 2.—A mixture of 510 g. of technical p-ter. butyl phenol and 114 g. of powdered sodium hydroxide was heated on an oil bath to 130° C. until it became a solid cake. To this was added 2 g. of copper dust and 316 g. of o-nitrochlorobenzene in several successive portions. The mixture was then heated at 140° C. for thirty minutes, allowed to cool to 100° C. and poured into two liters of ice water. The product was separated from the water by dissolving in ethylene dichloride, and after evaporation of the ethylene dichloride the residue was placed in a flask and distilled under reduced pressure. The first fraction, boiling at 120°–130° C/17 mm., consisted principally of unreacted starting materials. The main product distilled over at 184°–194° C/2.5 mm. This amounted to 415 g. or a yield of 76.5% of the theoretical.

Example 3.—95 g. of potassium hydroxide in the form of pellets was added to 350 g. of molten $\alpha,\alpha,\gamma,\gamma$-tetramethylbutylphenol. This was heated to 140° C., one gram of copper dust added and than 150 g. of p-nitrochlorobenzene in two portions. The heating was continued for another thirty minutes at 140° C. and the product was poured into two liters of ice water and extracted with ethylene dichloride. After evaporating the ethylene dichloride, the residue was distilled under reduced pressure. Two fractions, consisting of unreacted starting materials, distilled at 122°–145° C/15 mm. and 118°–122° C/3 mm. respectively. The main product distilled over at 195°–205° C/2 mm. and amounted to 211.6 g. or a yield of 65% of the theoretical. After recrystallization from petroleum ether, it melted at 72°–73° C.

Example 4.—A mixture of 39 g. of the technical sodium salt of 2-nitro-4-chloro phenol, 100 cc. of water, 40 g. of technical 2,4-dinitro-chlorobenzene, and 600 cc. of 95% ethanol was heated on a water bath with stirring for 10 hours, cooled, diluted with an equal volume of water, filtered, and washed with water. The solid was heated with 200 cc. of 95% ethanol cooled, and filtered. It was recrystallized from a mixture of ethanol and methyl ethyl ketone, giving 42 g. or 62% yield of product, melting at about 157°–158° C. Analysis showed 10.26% chlorine; calculated for 2,4-dinitro-2'-nitro-4'-chlorodiphenyl ether $C_{12}H_8O_7N_3Cl$ 10.45% Cl.

The best method of using these diphenyl ethers in insecticidal compositions will depend to a large extent on the particular insect or class of insects which is being combatted. When used to control chewing insects such as the bean beetle they may be applied as either a dust or a spray in which the active ingredient varies from 0.05 to 5% of the total. The dusts are readily prepared by dissolving the ether in a suitable solvent such as acetone, mixing the proper amount of solution with an inert powdered substance such as talc, lime, etc. and drying while stirring the powder. Suitable formulae are the following—

|  | Parts by weight |
|---|---|
| (A) Active ingredient | 1 |
| Talc or lime | 98 |
| Spreader (cetyl dimethyl ethyl ammonium ethyl sulfate) | 1 |
| (B) Active ingredient | 1 |
| Alum sludge | 48 |
| Lime | 48 |
| Soy bean oil | 3 |

Sprays to combat chewing insects can be made by applying a larger quantity of the active ingredient to a powder, adding an emulsifying agent and dispersing in sufficient water to reduce the quantity of active ingredient in the final spray to the desired concentration. A suitable formula for this type of spray is—

|  | Parts |
|---|---|
| 1 part active ingredient deposited on 2 parts magnesium carbonate | 3 |
| Emulsifying agent | 0.5 |
| Water | 96.5 |

Sprays used to kill sucking insects, such as red spiders, by contact can be made by dissolving the active ingredient in an organic liquid that does not affect the foliage, adding an emulsifying agent, and dispersing the solution in sufficient water to reduce the concentration of active ingredient to the desired point. A suitable formula for this type of spray is—

|  | Parts |
|---|---|
| .25 part active ingredient and .25 part emulsifying agent dissolved in .50 part pine oil | 1 |
| Water | 100–300 |

Spray used to combat flying insects such as common flies, mosquitoes, etc. can be made by merely dissolving the proper amount of active ingredient, 1–5%, in an organic solvent such as kerosene to which a spreading agent may be added if desired.

The table given below shows the results of a number of tests using a number of different nitro substituted diphenyl oxides in combating a number of the more common insect pests. The first two columns of data show the percentage of flies knocked down and killed respectively by a 2% solution of the active ingredient, using the standard Peet-Grady method of testing. The next three columns show respectively the percentage of aphids on nasturtium and cabbage plants, red spiders on ageratum and bean plants, and mealy bugs on coleus, killed by an emulsion spray in which the active ingredient was diluted 1:1200. These tests were made by spraying the emulsion under standard conditions on foliage infested with the insects. The plants were allowed to stand for 24 hours and then counts were made on all of the insects on the plants for each test. No plant injury was noticeable in any of the tests. The fifth, sixth and seventh columns of data show respectively the per cent. kill of Mexican bean beetle adults, bean beetle larvae on bean plants, and diamond-back cabbage worm larvae using a 1% dust or spray. The tests were conducted the same as with the other plant insects except that the counts were made at the end of 96 hours instead of 24 hours. In every instance the data given are the average of at least three similar tests. In the last column the effect that the 1% dust or spray has upon the plants treated is indicated; F meaning fatal, Sv. severe injury, Sl. slight injury, and No indicating no injury.

| Active ingredient | Fly tests | | 1:1200 dilution | | | 1% dust or spray | | | Plant injury |
|---|---|---|---|---|---|---|---|---|---|
|  | Percent down | Percent kill | Aphids | Red spiders | Mealy bugs | Bean beetle adults | Bean beetle larvae | Cabbage worm larvae |  |
| $C_6H_5OC_6H_5$ | 31 | 18 | 52 | 26 | 6 | 5 | 13 | 50 | Sv. |
| 4-$NO_2C_6H_4OC_6H_5$ | 51 | 29 |  | 85 |  |  |  | 70 | Sl. |
| 2-$NO_2C_6H_4OC_6H_5$ |  |  |  | 95 | 58 |  | 53 |  | Sl. |
| 2,4-$(NO_2)_2C_6H_3OC_6H_5$ |  |  |  | 92 | 76 | 60 |  |  | No |
| 4-$NO_2C_6H_4OC_6H_4CH_3$-2 | 54 | 34 |  | 90 | 73 |  | 76 |  | Sl. |
| 4-$NO_2C_6H_4OC_6H_4CH_3$-3 |  |  |  | 95 | 71 |  | 90 |  | Sl. |
| 4-$NO_2C_6H_4OC_6H_4CH_3$-4 |  |  |  | 99 | 40 |  | 76 | 90 | Sl. |
| 4-$NO_2C_6H_4OC_6H_3(CH_3)_2$ |  |  |  | 62 |  |  | 96 |  | Sl. |
| 4-$NO_2C_6H_4OC_6H_4C(CH_3)_3$-4 |  |  | 89 | 93 | 60 | 53 |  |  | No |
| 2-$NO_2C_6H_4OC_6H_4C(CH_3)_3$-4 |  |  |  | 88 | 50 |  | 86 | 73 | No |
| 4-$NO_2C_6H_4OC_6H_4C(CH_3)_2CH_2C(CH_3)_3$-4 |  |  |  |  |  |  | 46 |  | No |
| 4-$NO_2C_6H_4OC_6H_3$-2 |  |  |  | 95 | 47 |  | 50 |  | Sl. |
| 4-$NO_2C_6H_4OC_6H_4Cl$-4 | 58 | 31 |  | 100 | 82 |  | 96 | 80 | Sl. |
| 4-$NO_2C_6H_4OC_6H_4Cl$-2 |  |  | 71 | 60 |  |  | 86 | 63 | Sl. |
| 2,4-$(NO_2)_2C_6H_3OC_6H_3Cl$-4-$NO_2$-2 |  |  |  |  |  |  |  |  |  |

From these data it is apparent that nitro substituted diphenyl oxides are more effective insecticides than the unsubstituted compound when used as either a contact or stomach poison. Also that they have a wide range of usefulness in combating insect pests. For purposes of illustration the simpler nitro substituted diphenyl oxides have been given in the foregoing table, but it is apparent that others can be used in place of those specifically mentioned. Instead of being used as the sole toxic ingredient the compounds herein disclosed may be mixed with other organic or inorganic insecticidal compositions such as lead or magnesium arsenate, organic thiocyanates, phenyl benzyl ethers, etc. or naturally occurring insecticides such as derris, rotenone, pyrethrum, etc. Such mixtures may have particular usefulness in special applications and frequently give better results than would be anticipated from the killing power of each ingredient when used alone.

I claim:

1. An insecticidal composition containing as a toxic ingredient a nitro substituted diphenyl oxide.

2. An insecticidal composition containing as a toxic ingredient ortho nitro phenyl para tertiary butyl phenyl oxide.

3. An insecticidal composition containing as a toxic ingredient p-nitro-o'-phenyl diphenyl oxide.

4. An insecticidal composition containing as a toxic ingredient p-nitro-p'-chlordiphenyl oxide.

WILLIAM F. HESTER.